(12) United States Patent
Kullmann et al.

(10) Patent No.: US 8,695,470 B2
(45) Date of Patent: Apr. 15, 2014

(54) SAW BLADE INCLUDING TEETH HAVING A CHIP DEFORMING ELEMENT

(75) Inventors: Joerg H Kullmann, Spangenberg (DE); Frank Carrier, Fuldabrueck (DE)

(73) Assignee: Wikus-Saegenfabrik Wilhelm H. Kullmann GmbH & Co. KG (DE)

( * ) Notice: Subject to any disclaimer, the term of this patent is extended or adjusted under 35 U.S.C. 154(b) by 598 days.

(21) Appl. No.: 12/840,472

(22) Filed: Jul. 21, 2010

(65) Prior Publication Data

US 2011/0017042 A1 Jan. 27, 2011

(30) Foreign Application Priority Data

Jul. 21, 2009 (DE) .......................... 10 2009 027 896

(51) Int. Cl.
*B26D 1/46* (2006.01)

(52) U.S. Cl.
USPC .................................. 83/661; 83/851; 83/853

(58) Field of Classification Search
USPC ............ 83/851, 835, 848, 847, 853, 661, 855
See application file for complete search history.

(56) References Cited

U.S. PATENT DOCUMENTS

| | | | | |
|---|---|---|---|---|
| 820,969 A | * | 5/1906 | Grelok | 83/851 |
| 4,867,026 A | * | 9/1989 | Henning et al. | 83/835 |
| 5,425,296 A | | 6/1995 | Kullmann | |
| 5,477,763 A | | 12/1995 | Kullmann | |
| 6,834,573 B1 | | 12/2004 | Nakahara | |
| 7,131,365 B2 | * | 11/2006 | Hall et al. | 83/846 |
| 8,113,100 B1 | * | 2/2012 | Cranna et al. | 83/851 |
| 2001/0004860 A1 | * | 6/2001 | Kullmann et al. | 83/846 |
| 2011/0154970 A1 | * | 6/2011 | Oshibe et al. | 83/835 |
| 2012/0000338 A1 | * | 1/2012 | Elliston et al. | 83/848 |

FOREIGN PATENT DOCUMENTS

| | | |
|---|---|---|
| DE | 10030168 | 6/1995 |
| DE | 102006015278 | 4/2006 |
| DE | 4200423 | 7/2010 |
| EP | 1101558 | 5/2001 |

* cited by examiner

*Primary Examiner* — Omar Flores Sanchez
(74) *Attorney, Agent, or Firm* — Thomas | Horstemeyer, LLP

(57) ABSTRACT

A saw blade (1) includes a base body (2) and a plurality of teeth (10) being connected to the base body (2), the teeth (10) including a cutting portion (6) and a chip producing surface (7). At least a part of the teeth (10) are arranged in a group of teeth being repeatedly arranged along the base body (2). The group of teeth (10) includes at least three unset teeth (10) having different widths. The broadest tooth (10) in the group of teeth (10) does not include a chip deforming element being located next to the chip forming surface (7) in a direction facing away from the cutting portion (6). At least one other tooth (10) in the group of teeth (10) includes a chip deforming element (8) being located next to the chip forming surface (7) in a direction facing away from the cutting portion (6).

13 Claims, 6 Drawing Sheets

SAW BLADE INCLUDING TEETH HAVING A CHIP DEFORMING ELEMENT

CROSS REFERENCE TO RELATED APPLICATIONS

This application claims priority to co-pending German Patent Application No. DE 10 2009 027 896.6 entitled "Sägeblatt mit Zähnen mit einem Spanumformelement", filed Jul. 21, 2009.

FIELD OF THE INVENTION

The present invention generally relates to a saw blade including a base body and a plurality of teeth being connected to the base body. Each of the teeth includes a cutting portion and a chip producing surface. At least a part of the teeth is arranged in a group of teeth which is repeated along the length of the base body. The group of teeth includes at least three unset teeth having different widths.

BACKGROUND OF THE INVENTION

A saw blade including a base body and a plurality of teeth being connected to the base body is known from German Patent Application No. DE 42 00 423 A1 corresponding to U.S. Pat. Nos. 5,477,763 and 5,425,296. The teeth include a cutting portion and a chip producing surface. The teeth are arranged in a group being repeated along the base body, the group including at least three unset teeth having different widths and heights. Due to this special kind of group technology including unset teeth, one attains great cutting performance combined with a stabilized straight movement of the saw blade without the danger of lateral displacement. In this way, the known saw blade substantially differs from other known saw blades including set teeth or being designed according to the so called triple chip technology.

Another saw blade including a base body and a plurality of teeth being connected to the base body is known from German Patent Application No. DE 100 30 168 A1 corresponding to U.S. Pat. No. 6,834,573 B1. The teeth include a cutting portion and a chip producing surface. The teeth are alternately set towards the left and the right. In this way, all teeth—or at least the set teeth—have the same width and the same height. Each of the teeth includes a curved surface serving as chip deforming element and being arranged next to the chip producing surface in a direction facing away from the cutting portion. The chip deforming element serves to produce chips having a small winding radius.

Another saw blade including a base body and a plurality of teeth being connected to the base body is known from European patent application No. EP 1 101 558 A1. The teeth include a cutting portion and a chip producing surface. Each of the teeth includes a chip deforming element being located next to the chip producing surface in a direction facing away from the cutting portion. This prior art document does not disclose how the teeth are arranged along the saw blade (e.g. in a group of teeth or the like). The chip deforming element deforms the chips to have a small winding radius.

A saw blade including a base body and a plurality of teeth being connected to the base body is known from German Patent Application No. DE 10 2006 015 278 A1. The teeth include a cutting portion and a chip producing surface. The invention described in this prior art document relates to the design of a chip deforming element as a plane chip guiding step being located at a protrusion of the base body, meaning not at the insert of the tooth which includes the chip producing surface. FIG. 1 of this prior art document illustrates a saw blade of the respective prior art for this document in which the chip deforming element is located at the insert of the tooth.

SUMMARY OF THE INVENTION

The present invention relates to a saw blade including a base body and a plurality of teeth being connected to the base body, the teeth including a cutting portion and a chip producing surface. At least a part of the teeth are arranged in a group of teeth being repeatedly arranged along the base body. The group of teeth includes at least three unset teeth having different widths. The broadest tooth in the group of teeth does not include a chip deforming element being located next to the chip forming surface in a direction facing away from the cutting portion. At least one other tooth in the group of teeth includes a chip deforming element being located next to the chip forming surface in a direction facing away from the cutting portion.

The present invention also relates to a saw blade including a base body and a plurality of teeth. The base body is made of a first metal material. The teeth are formed by a plurality of protrusions extending from the base body. The protrusions are made of the first metal material. Each of the protrusions is connected to an insert, the inserts being made of a second material which is harder than the first metal material. The teeth include a cutting portion and a chip producing surface, the cutting portion and the chip producing surface being located at the insert, the chip producing surface being the surface that initially cuts a work piece to be cut in the sense of beginning separation of a chip from the remainder of the work piece. At least a part of the teeth are arranged in a group of teeth being repeatedly arranged along the base body. The group of teeth include at least three unset teeth having different widths. The broadest tooth in the group of teeth does not include a chip deforming element being located next to the chip forming surface in a direction facing away from the cutting portion. At least one other tooth in the group of teeth includes a chip deforming element being located next to the chip forming surface in a direction facing away from the cutting portion, the chip deforming element being designed as a surface with which a chip is elastically-plastically deformed after it has been initially produced by the chip producing surface, the chip having a small winding radius and a short length.

The present invention also relates to a saw band for sawing metal, the saw band including a base body and a plurality of teeth. The base body is made of a first metal material. The teeth are formed by a plurality of protrusions extending from the base body. The protrusions are made of the first metal material. Each of the protrusions is connected to an insert, the inserts being made of a second material which is harder than the first metal material. The teeth include a cutting portion and a chip producing surface, the cutting portion and the chip producing surface being located at the insert, the chip producing surface being the surface that initially cuts a work piece to be cut in the sense of beginning separation of a chip from the remainder of the work piece. At least a part of the teeth are arranged in a group of teeth being repeatedly arranged along the base body. The group of teeth include at least three unset teeth having different widths. The broadest tooth in the group of teeth does not include a chip deforming element being located next to the chip forming surface in a direction facing away from the cutting portion. At least one other tooth in the group of teeth includes a chip deforming element being located next to the chip forming surface in a direction facing away from the cutting portion, the chip deforming element being designed as a surface with which a chip is elastically-plastically deformed after it has been initially produced by the chip producing surface, the chip having a small winding radius and a short length.

The saw blade may be especially designed as an elongated saw band having a linear or straight arrangement of the teeth one after the other. However, it may also be designed as a saw blade of a hacksaw or as a circular saw blade. It is preferred that the teeth are at least partly made of hard metal and carbide, respectively, or that the teeth include inserts made of such a material. In this way, the saw blade may especially serve for sawing work pieces made of metal.

The teeth of the novel saw blade are designed and arranged in accordance with a special type of the so called group technology according to which the group includes at least three teeth having different widths and preferably also different heights. Such an arrangement may be called a stepped arrangement of widths and heights. In this way, each tooth is associated with a specific portion of the cutting channel. The group of teeth is repeatedly arranged along the length of the saw band. It is possible that other teeth are arranged between the repeated group of teeth. Such a special type of group technology is to be distinguished from the so called triple chip technology and also from a simple repeated arrangement of an unset tooth, a tooth being set towards the left and a tooth being set towards the right.

In recent years, the development and the use of aluminum materials have continuously increased in many technical fields. Thus, there is a need for great cutting performance when sawing aluminum, while aluminum materials are known as producing long chips as they are sawed, these long chips leading to new challenges during removal of the chips.

During sawing of aluminum materials with prior art saw blades having a geometry in the sense of the special group technology, one attains very thin and comparatively long chips having a comparatively great winding radius. Such chips tend to form nests of chips and to cause clogging due to balls of chips being produced. Such chips have a negative influence on the cutting process and there are new challenges during removal and discharge of the chips.

When sawing materials with a prior art saw blade including an arrangement of the teeth in the sense of the triple chip technology—meaning only including two different teeth, namely the leading tooth and the trailing tooth—there are less problems with the above described formation of nests of chips. However, this advantage is necessarily combined with the immanent disadvantage that such saw blades have significantly lower cutting performance.

The novel saw blade is a new special advantageous combination of the advantages of the technologies of the special kind of group technology including unset teeth of different widths and the triple chip technology. These technologies were believed not to be combinable. The special group technology including unset teeth as it is known to a person with skill in the art especially from the products "FUTURA" and "FUTURA PLUS" of WIKUS-Sägenfabrik Wilhelm H. Kullmann GmbH & Co. KG realizes especially great cutting performance with good surface quality in the cutting channel due to the stabilized straight movement of the unset teeth. The great cutting performance results from the special distribution of the effective cutting portions of a plurality of teeth which are each associated with a specific strip-shaped portion of the cutting channel and which only remove chips in that region. At the same time, the novel saw blade produces comparatively short chips having a small winding radius as they were previously only known from the triple chip technology, but without having to accept the disadvantages of the triple chip technology.

This novel solution is realized by at least one tooth with the exception of the widest tooth in the group of teeth including a chip deforming element with which the chips are deformed after they have been initially produced or cut by the chip producing surface. The chip producing surface is the surface that initially cuts a work piece to be cut in the sense of beginning separation of a chip from the remainder of the work piece. The chip deforming element is a surface with which a chip is elastically-plastically deformed after it has been initially produced by the chip producing surface. The chips are elastically-plastically deformed such that they have a small and preferably approximately constant winding radius and preferably a short length. Thus, one especially does not produce thread chips, but instead short chips, especially short helical chips, short conical helical chips or short screw chips. Such chips can be removed from the cutting channel in a significantly improved way, and they jam less such that they do not get stuck in a 90° arc of an extraction system for removing chips, for example.

However, the novel saw blade is not only based on the finding that a chip deforming element has a positive influence on the production of short chips having a small winding radius while maintaining a great cutting performance, but additionally that special measures for maintaining a good surface quality in the cutting channel are required. These special measures in contrast to the prior art now include the feature of only arranging the chip deforming element at specific teeth. To be exact, the broadest tooth in the group of teeth does not include a chip deforming element. This broadest tooth—which is also designated as tooth C4—is the one that determines the surface quality in the cutting channel. Usually, the broadest tooth in the group of teeth simultaneously is the lowest tooth in the group. The broadest tooth in the group removes chips from the two outer portions of the cutting channel and thus determines the surface quality in the cutting channel. Due to the surprising omission of the chip deforming element at this broadest tooth, one now efficiently prevents chips having a small winding radius being produced at this place although it is desired to produce these chips at other places. Such chips having a small winding radius would result in the surface of the cutting channel being scratched. Instead, at this place, the saw blade produces elongated chips, these chips being quickly removed from the cutting channel such that they have less negative influence on the surface quality. It is preferred that the broadest tooth in the group of teeth is the lowest tooth in the group. Preferably, each of the other teeth in the group—with the exception of the broadest tooth—includes a chip deforming element. In this way, chips having the desired compact shape are produced without negatively influencing the surface quality in the cutting channel.

The base body may include a plurality of protrusions, an insert being connected to each of the protrusions. The inserts are made of a material which is harder than the material of the protrusions and of the base body. In this way, the teeth are formed by the protrusions and the inserts, while the cutting portion and the chip producing surface are located at the insert. In this way, one attains the advantage of only the insert having to be made of a material of special hardness, while the requirements to the base body are less. Especially, the material of the insert may be hard metal and carbide, respectively. When realizing such a design of the saw blade including a plurality of protrusions being located at the base body and inserts being connected thereto, especially by soldering or brazing, the chip deforming element is located at the insert.

All processing steps of manufacturing the cutting portion, the chip forming surface and the chip deforming element which are especially realized by grinding are realized at the inserts of the saw blade.

The chip deforming element may be designed as a surface having the shape of a step. Especially, the chip deforming element may be a more or less bent or straight surface. The chip deforming element is located adjacent to the chip producing surface, while the cutting portion is located adjacent to the other end of the chip producing surface. In other words, these elements are arranged in the order "cutting portion—chip producing surface—chip deforming element" when starting at the cutting portion. However, it is also possible to arrange additional elements and/or surface between the aforementioned elements.

The saw blade is especially a saw band including a linear and straight, respectively, arrangement of the teeth one after the other. The saw blade may also be a saw blade for a hacksaw or a circular saw blade.

The at least three teeth in the group are not set, and the cutting portions have a geometrically defined shape including an elongated cutting portion. It is preferred to arrange four teeth having different heights and widths in the sense of the teeth C1, C2, C3 and C4. However, other arrangements are also possible.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
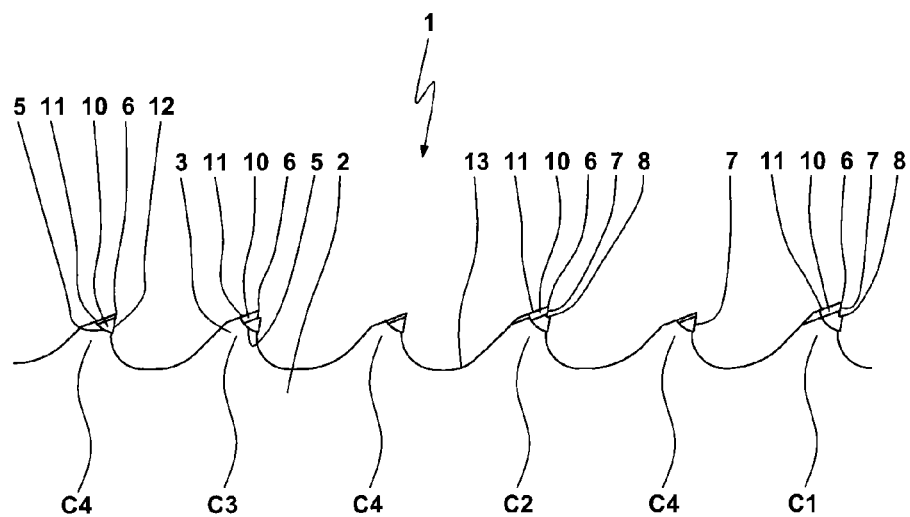
FIG. 1 is a schematic side view of a portion of a first exemplary embodiment of the novel saw blade.

Referring now in greater detail to the drawings, FIG. 1 illustrates a side view of a first exemplary embodiment of the novel saw blade 1. It is to be understood that FIG. 1 only shows a portion of the saw blade 1 which further extends towards the left and the right and the bottom. In FIG. 1, the saw blade 1 is designed as an elongated saw band. However, the saw blade 1 could also be designed as a circular saw blade or as a less elongated saw blade for a hacksaw. The saw blade 1 is made of metal and serves for sawing metal.

Figure 2:
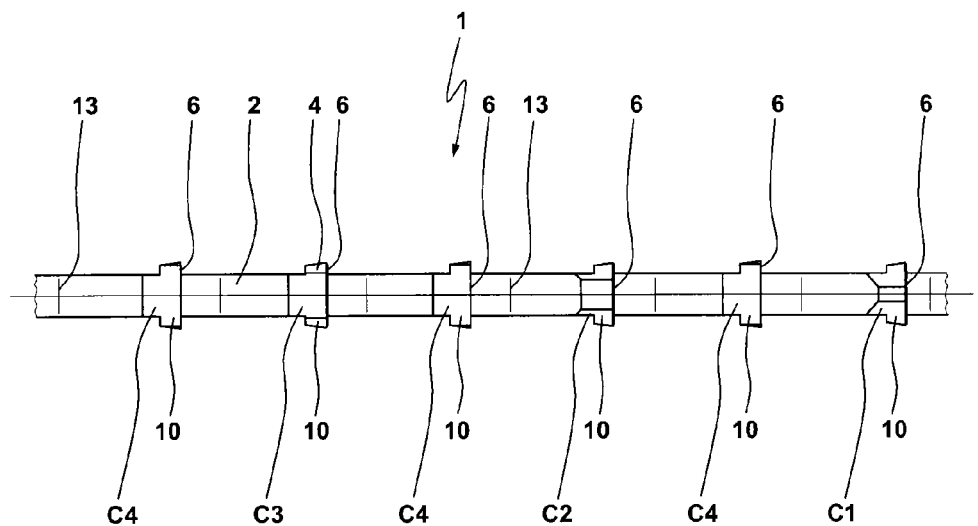
FIG. 2 is a top view of the saw blade according to FIG. 1.
Figure 3:
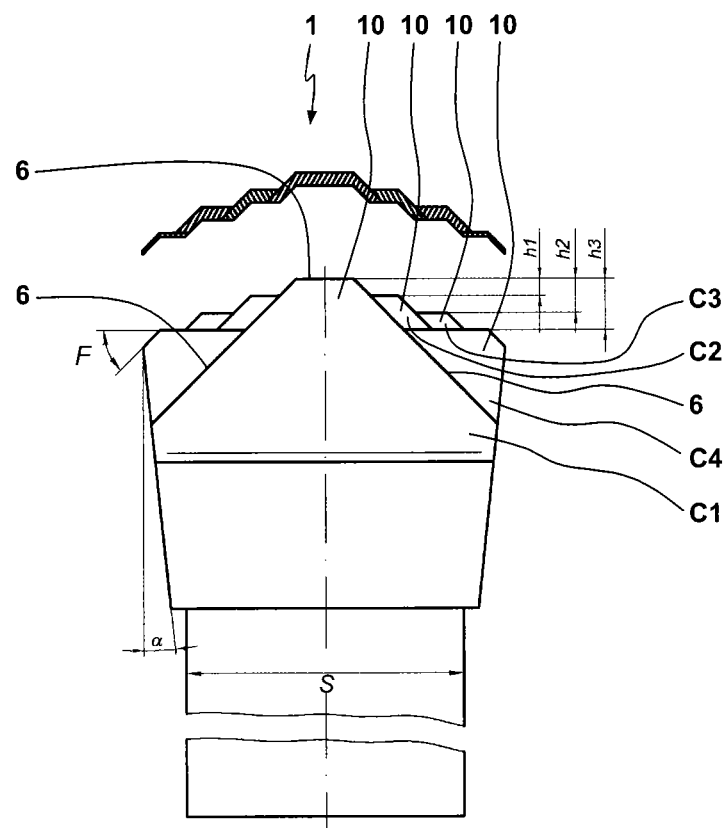
FIG. 3 is a front view of the saw blade according to FIG. 1.

Further views of the saw blade 1 illustrated in FIG. 1 are illustrated in FIGS. 2 and 3. In the following, the first exemplary embodiment of the novel saw blade 1 is described with reference to FIGS. 1-3 and additionally to FIG. 4 in which the novel design of the saw blade 1 is to be seen in a slightly different illustration.

The saw blade 1 includes a base body 2 of which only a portion is to be seen. The base body 2 includes a plurality of protrusions 3 each being connected to a respective insert 4. The inserts 4 are made of a material being harder than the material of the protrusions 3 and of the base body 2 of the saw blade 1. Preferably, the material of the insert 4 is hard metal and carbide, respectively. In other words, the saw blade 1 is carbide tipped. A connecting surface 5 is located between the protrusion 3 and the insert 4, the connecting surface 5 fixedly connecting the insert 4 to the protrusion 3, especially by soldering or by brazing.

The protrusion 3 with the insert 4 forms a tooth 10 having a cutting portion 6 and a chip producing surface 7. Furthermore, each tooth 10 includes a tooth back 11, a tooth face 12, a tooth base 13 and a tool flank or free surface 14.

At least a part of the teeth 10 is arranged in a group which is repeatedly arranged along the base body 2, the group at least including three unset teeth 10 having different heights and widths. As it is especially to be seen in FIG. 3, the group in the illustrated example includes four different teeth C1, C2, C3 and C4. The tooth C1 is the highest and narrowest tooth 10. The tooth C2 is the second highest and second narrowest tooth 10. The tooth C3 is the third highest and third narrowest tooth 10. The tooth C4 is the lowest and widest tooth 10 in the group. As it is illustrated in FIG. 1, the preferred exemplary group of teeth 10 includes the order of teeth C4-C3-C4-C2-C4-C1. This group is then repeatedly arranged along the length of the saw blade 1 while it is possible to arrange different teeth 10 between the teeth 10 in a group and/or between groups and/or to vary the arrangement of the group. It is to be understood that the illustration of FIG. 3 does not show the additional tooth C4 being arranged between the teeth C2 and C3 since this tooth C4 is covered by the projection of the second tooth C4 as seen from the front. Such an arrangement of teeth 10 in this special group technology with unset teeth 10 realizes very good cutting performance with a straight movement of the saw blade 1. FIG. 3 further illustrates the angles α, F as well as the width S and the height differences h1, h2 and h3.

In addition to the arrangement in a group, the teeth 10 have a special design and arrangement with respect to an element and a surface, respectively, which is located adjacent to the chip producing surface 7. At least one tooth 10 in the group includes a chip deforming element 8 being located next to the chip producing surface 7 in a direction facing away from the cutting portion 6. This arrangement is to be understood in a way that the chip deforming element 8 is not arranged in the direction of the cutting portion 6 as seen in a direction from the cutting producing surface 7, but instead in the other direction—meaning towards the tooth base 13. However, the chip deforming element 8 does not have to be arranged directly next to the chip producing surface 7. It is also possible to arrange other surfaces or elements between the chip producing surface 7 and the chip deforming element 8. It is also possible that the chip deforming element 8 includes a plurality of surfaces or elements.

The chip deforming element 8 serves to deform the shape of the chip of cut material which has been initially produced by the chip producing surface 7 during sawing of the material.

For this reason, the present application uses the term of a chip deforming element since this element does not initially produce the chip, but it rather deforms the chip after it has been initially produced. The chip deforming element 8 could also be called a chip deforming surface or a chip curling element. The chip deforming element 8 has a design such that it preferably produces short chips by deforming them to have a small winding radius. Especially when sawing aluminum materials which tend to produce long chips, there otherwise is the problem of nests of chips being produced resulting in difficulties during removal of the chips from the cutting channel. Due to the chip deforming element 8, the saw blade 1 now produces short and narrow wound chips which cause significantly less problems during removal and disposal. In the exemplary embodiments of the saw blade 1 illustrated in FIGS. 1-3, the teeth C1, C2 and C3 each include such a chip deforming element 8. The lowest and widest tooth 10 in the group—meaning the tooth C4 in this case—does not include a chip deforming element. The tooth C4 as the widest tooth 10 is ultimately responsible for the quality of the surface in the cutting channel. This is also to be seen in FIG. 3 illustrating the special distribution of the effective cutting portions of a plurality of teeth 10 by the hatching in the upper portion. In this way, each effective cutting portion of the teeth 10 is associated with a specific strip-shaped portion of the cutting channel, and it only removes chips from that portion. The tooth C4 does not include a chip deforming element 8 to prevent the (otherwise desired) chips having a small winding radius being produced at that place during sawing since these chips would scratch the surface in the cutting channel.

Figure 4:
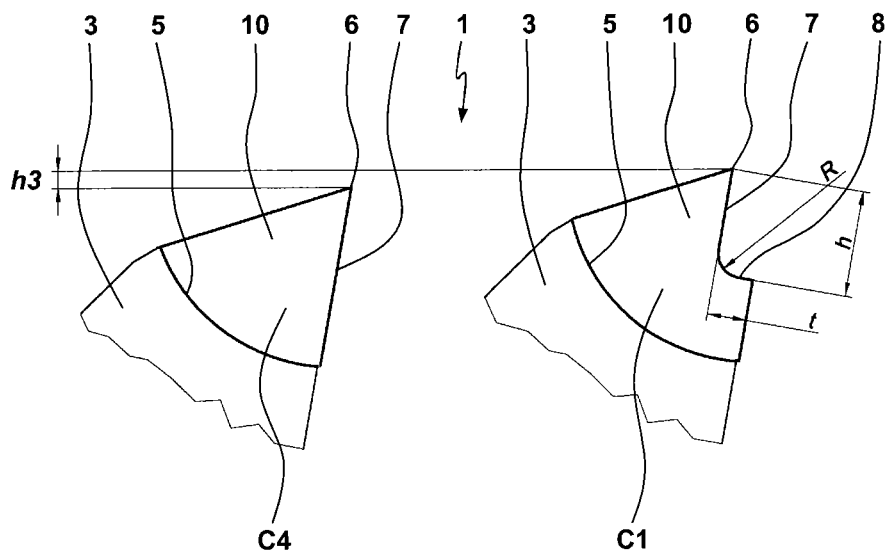
FIG. 4 is a enlarged schematic side view of two teeth of the novel saw blade.

FIG. 4 illustrates the differences between the left tooth C4 not including a chip deforming element and the right tooth C1 including a chip deforming element 8 in an especially clear representation. The height difference between these teeth is designated with h3. In this example, the chip deforming surface 8 is designed as a bent surface having the shape of a circular arc with a radius R and a depth t. Furthermore, the height h as the sum of the chip producing surface 7 and the chip deforming element 8 is indicated in FIG. 4.

The following table includes a preferred example of values for h, t and R of the chip deforming element 8 which are especially preferred:

| Variable | Value Range [mm] | Preferred Value [mm] |
| --- | --- | --- |
| h | 0.4-2.0 | 1.0 |
| t | 0.2-2.0 | 1.0 |
| R | 0.2-1.0 | 0.5 |

Figure 5:
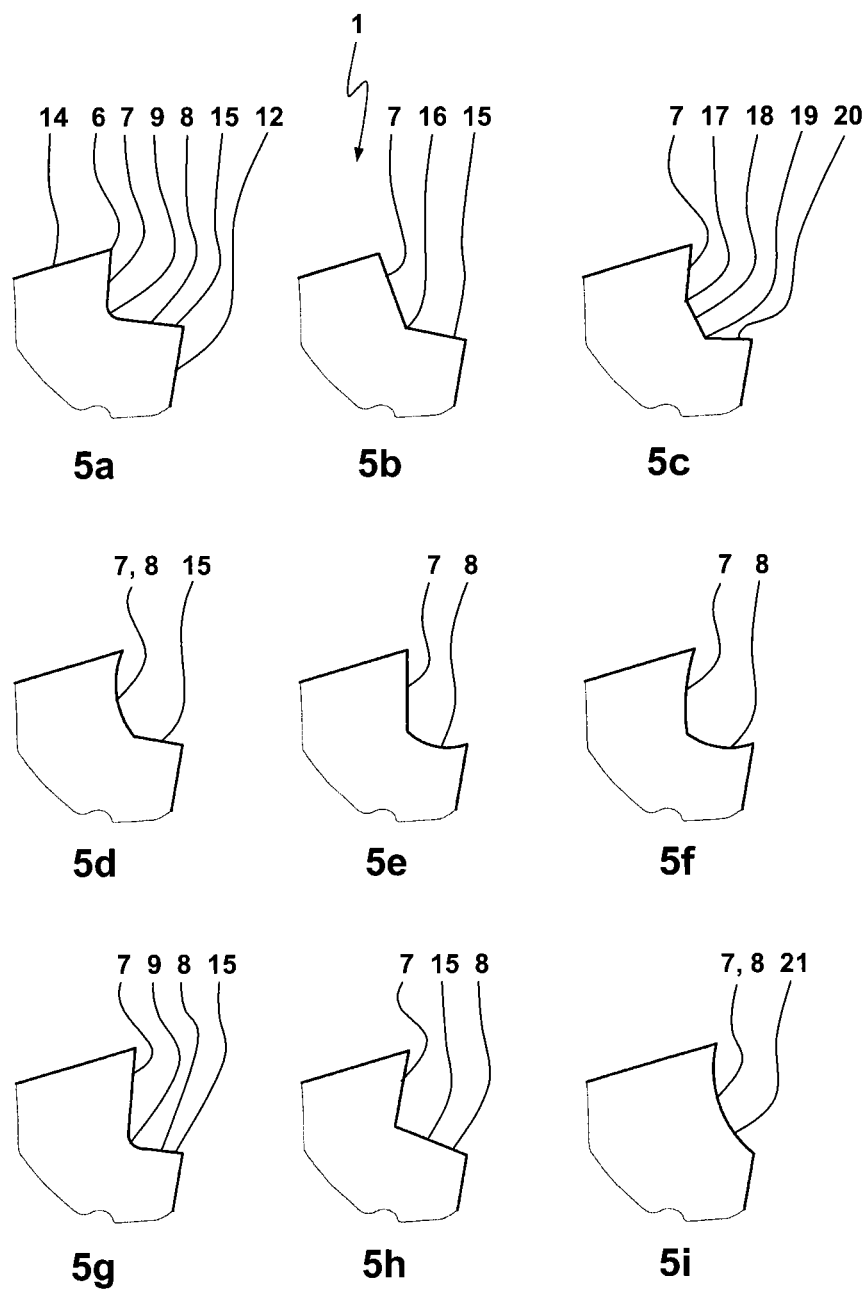
FIG. 5 illustrates side views of different exemplary embodiments of a tooth of the novel saw blade.

FIG. 5 illustrates different exemplary embodiments of the tip of a tooth 10 including a chip deforming element 8. The different embodiments are associated with the numbers 5*a* to 5*i*. Each of the illustrations shows a part of the tip of the tooth 10 including a free surface 14, the cutting portion 6, the chip producing surface 7 and the tooth face 12. Due to the fact that the illustrations of FIGS. 5*a* to 5*i* have many features in common, only the first Fig. (FIG. 5*a*) includes all reference numerals for reasons of clarity of the drawings.

It is to be seen in FIG. 5*a* that the chip deforming element 8 includes a circular or bent portion 9 and a straight portion 15. The angle between the chip producing surface 7 and the straight portion 15 of the chip deforming element 8 is slightly greater than 90°. The chip producing surface 7 is arranged at a comparatively small angle with respect to the free surface 14.

In contrast thereto, the tip of the tooth 10 in FIG. 5*b* has a design such that the chip deforming element 8 has a more or less sharp transition portion 16 (as far as it can be practically produced) and a straight portion 15. The chip producing surface 7 is arranged at a significantly greater angle with respect to the free surface 14, the angle being slightly smaller than 90°.

In the exemplary embodiment illustrated in FIG. 5*c*, the chip deforming element 8 next to the chip producing surface 7 includes a first transition portion 17, a first straight portion 18, a second transition portion 19 and a second straight portion 20.

In the exemplary embodiment of the tip of the tooth 10 illustrated in FIG. 5*d*, the chip producing surface 7 is designed to be bent, and it is a combination of the chip producing surface 7 and of the chip deforming element 8. The chip deforming element 8 still includes the straight portion 15.

The tooth 10 illustrated in FIG. 5*e* instead includes the straight chip producing surface 7 and the bent chip deforming element 8 being connected thereto.

In FIG. 5*f*, the chip producing surface 7 as well as the chip deforming element 8 are designed to be bent, the radius of the chip producing surface 7 being significantly greater than the radius of the chip deforming element 8.

In the exemplary embodiment of the tip of the tooth 10 illustrated in FIG. 5*g*, the chip producing surface 7 again has a straight design. The chip deforming element 8 includes the bent portion 9 as well as the straight portion 15. In contrast to the embodiment illustrated in FIG. 5*a*, the depth of the straight portion 15 is chosen to be smaller.

In the exemplary embodiment of the tip of the tooth 10 illustrated in FIG. 5*h*, the straight portion 15 of the chip deforming element 8 again is more or less straight and is located next to the chip producing surface 7 as far as such a shape can be produced by grinding, for example.

The exemplary embodiment of the tip of the tooth 10 of the saw blade 1 illustrated in FIG. 5*i* shows the combination of the functions of the chip producing surface 7 and of the chip deforming element 8 in one common bent surface 21.

Figure 6:
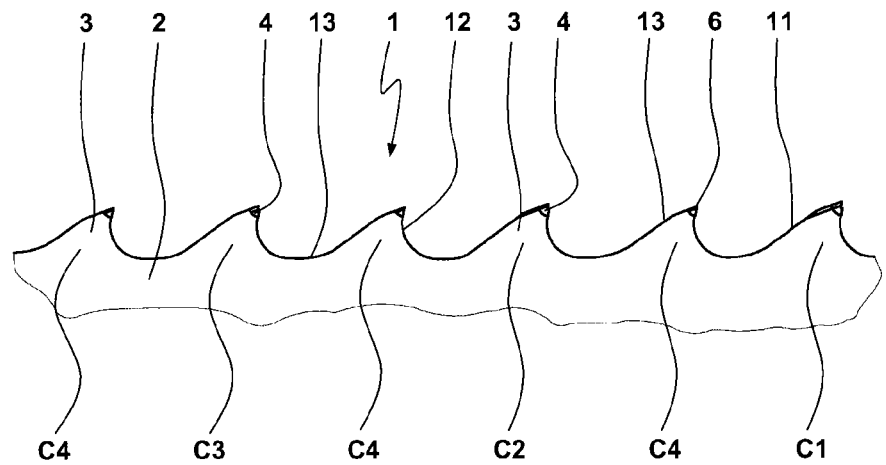
FIG. 6 is a side view of a portion of a second exemplary embodiment of the novel saw blade in full scale.

FIG. 6 illustrates another exemplary embodiment of the novel saw blade 1. In contrast to the embodiments of the saw blade 1 illustrated in FIGS. 1-3, the illustration is chosen to be in full scale which makes it possible to see that the inserts 4 compared to the protrusions 3 are actually significantly smaller compared to how this was illustrated in FIG. 1 in an exaggerated way to better explain the novel elements of the saw blade 1. With respect to the further feature of the saw blade 1, it is referred to the above description with respect to FIG. 1 as well as to the reference numerals indicated in FIG. 1. The ratio of the inserts 4 with respect to the height of the entire tooth 10 from the tip to the tooth base 13 is approximately 1:5 when using a toothening of approximately 0.85 to 1.15 teeth per inch. The distribution of the teeth changes from 0.85 to 1.15 teeth per inch to approximately 3 to 4 teeth per inch while the size of the inserts 4 is only reduced to approximately 50% with a ratio of 1:2.

Figure 7:
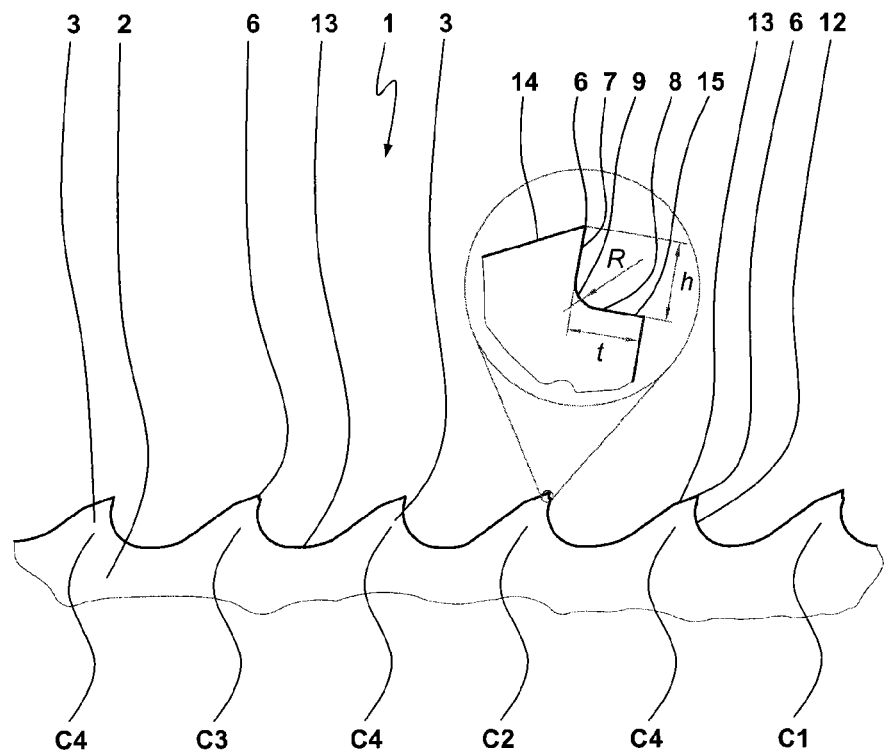
FIG. 7 is a side view of a portion of a third exemplary embodiment of the novel saw blade in full scale.

FIG. 7 illustrates another exemplary embodiment of the saw blade 1 in full scale. To nevertheless better clarify the features of the design of the tip of the tooth 10, a respective portion of one of the teeth 10 in FIG. 7 is illustrated at an enlarged scale. In contrast to the above described embodiments of the saw blade 1, this saw blade 1 does not include inserts in the region of its protrusions 3, but instead the teeth 10 including the cutting portion 6, the chip producing surface 7 and the chip deforming element 8 have been directly produced at the tooth 10, especially by grinding. For example, the saw blade 1 may be designed as a bimetallic saw blade.

Figure 8:
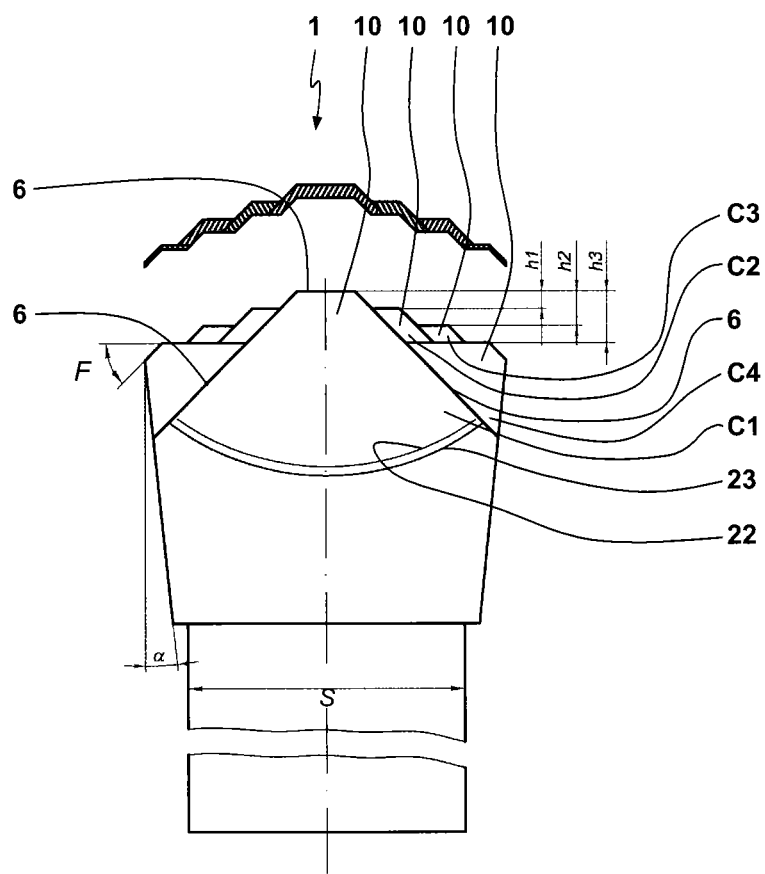
FIG. 8 illustrates a front view of another exemplary embodiment of the novel saw blade.

FIG. 8 illustrates a similar view of the saw blade 1 as FIG. 1, while it has been tried to better illustrate the actual shape of the tooth 10 in this portion by introducing the circular lines 22, 23. The circular lines 23, 23 result from the radius of the grinding disc which is used for producing the chip producing surface 7 and the chip deforming element 8. Due to this circular design, the chips are moved in the center of the cutting channel during sawing which results in the danger of damaging the surface of the cutting channel being further reduced.

Figure 9:
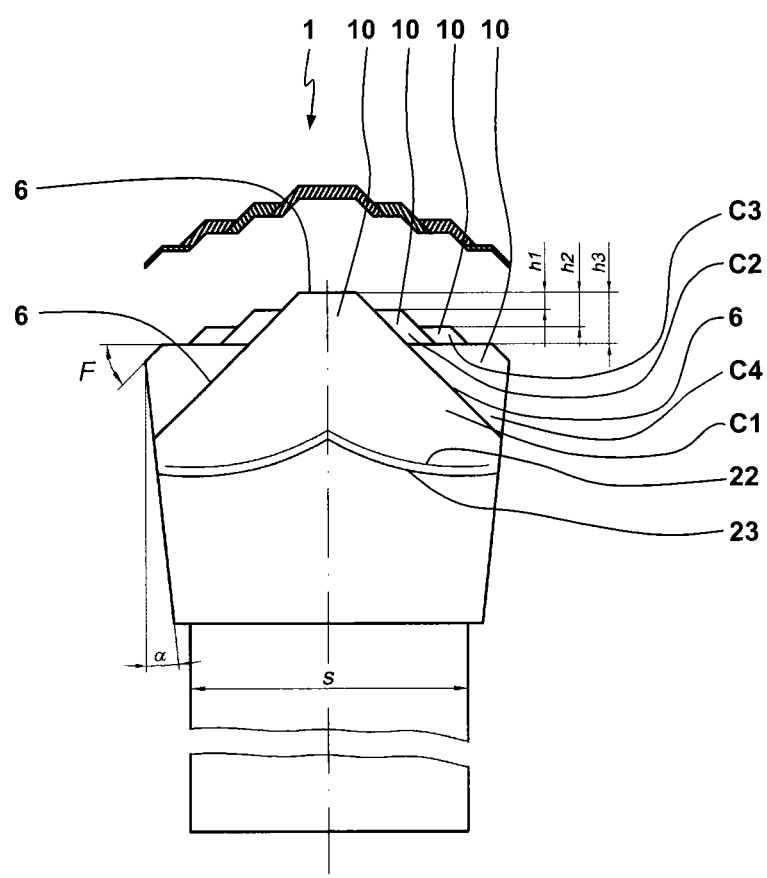
FIG. 9 illustrates a front view of another exemplary embodiment of the novel saw blade.

FIG. 9 illustrates a similar view of the saw blade 1 as FIGS. 1 and 8. In this case, it has also been tried to better illustrate the actual shape of the tooth 10 in this portion by introducing the two circular lines 22, 23. The circular lines 22, 23 result from the radius of the grinding disc which preferably has been used for producing the chip producing surface 7 and the chip deforming element 8. In this example, the chip deforming element 8 has been produced by two grinding sections. However, it is also possible to use more than two grinding sections.

Many variations and modifications may be made to the preferred embodiments of the invention without departing substantially from the spirit and principles of the invention. All such modifications and variations are intended to be included herein within the scope of the present invention, as defined by the following claims.

We claim:

1. A saw blade, comprising:
a base body, the base body being made of a first metal material; and
a plurality of teeth,
the teeth being formed by a plurality of protrusions extending from the base body, the protrusions being made of the first metal material,
each of the protrusions being connected to an insert, the inserts being made of a second material which is harder than the first metal material,
the teeth including a cutting portion and a chip producing surface, the cutting portion and the chip producing surface being located at the insert, the chip producing surface being the surface that initially cuts a work piece to be cut in the sense of beginning separation of a chip from the remainder of the work piece,
at least a part of the teeth being arranged in a group of teeth being repeatedly arranged along the base body,
the group of teeth including at least three unset teeth having different widths,
a broadest tooth in the group of teeth not including a chip deforming element being located next to the chip producing surface in a direction facing away from the cutting portion, and
at least one other tooth in the group of teeth including a chip deforming element being located next to the chip producing surface in a direction facing away from the cutting portion, the chip deforming element being designed as a surface with which a chip is elastically-plastically deformed after it has been initially produced by the chip producing surface, the chip having a small winding radius and a short length.

2. The saw blade of claim 1, wherein the remaining tooth in the group of teeth with the exception of the broadest tooth in the group of teeth include a chip deforming element.

3. A saw band for sawing metal, comprising:
a base body, the base body being made of a first metal material; and
a plurality of teeth,
the teeth being formed by a plurality of protrusions extending from the base body, the protrusions being made of the first metal material,
each of the protrusions being connected to an insert, the inserts being made of a second material which is harder than the first metal material,
the teeth including a cutting portion and a chip producing surface, the cutting portion and the chip producing surface being located at the insert, the chip producing surface being the surface that initially cuts a work piece to be cut in the sense of beginning separation of a chip from the remainder of the work piece,
at least a part of the teeth being arranged in a group of teeth being repeatedly arranged along the base body,
the group of teeth including at least three unset teeth having different widths,
a broadest tooth in the group of teeth not including a chip deforming element being located next to the chip producing surface in a direction facing away from the cutting portion, and
at least one other tooth in the group of teeth including a chip deforming element being located next to the chip producing surface in a direction facing away from the cutting portion, the chip deforming element being designed as a surface with which a chip is elastically-plastically deformed after it has been initially produced by the chip producing surface, the chip having a small winding radius and a short length.

4. The saw blade of claim 1, wherein the chip deforming element includes a surface having the shape of a step.

5. The saw blade of claim 1, wherein the chip producing element includes a curved surface.

6. The saw blade of claim 1, wherein the chip producing element includes a straight surface.

7. The saw blade of claim 1, wherein the teeth in the group of teeth have different heights, the group of teeth including a lowest tooth, the broadest tooth also being the lowest tooth in the group of teeth.

8. The saw blade of claim 1, wherein the saw blade is a saw band.

9. The saw blade of claim 1, wherein the saw blade is a saw blade for sawing metal.

10. The saw blade of claim 3, wherein the chip deforming element includes a surface having the shape of a step.

11. The saw blade of claim 3, wherein the chip producing element includes a curved surface.

12. The saw blade of claim 3, wherein the chip producing element includes a straight surface.

13. The saw blade of claim 3, wherein the teeth in the group of teeth have different heights, the group of teeth including a lowest tooth, the broadest tooth also being the lowest tooth in the group of teeth.

* * * * *